Feb. 26, 1963 W. K. GANNETT ET AL 3,078,766
EQUILIBRATOR FOR A GUN
Filed June 8, 1960 4 Sheets-Sheet 1
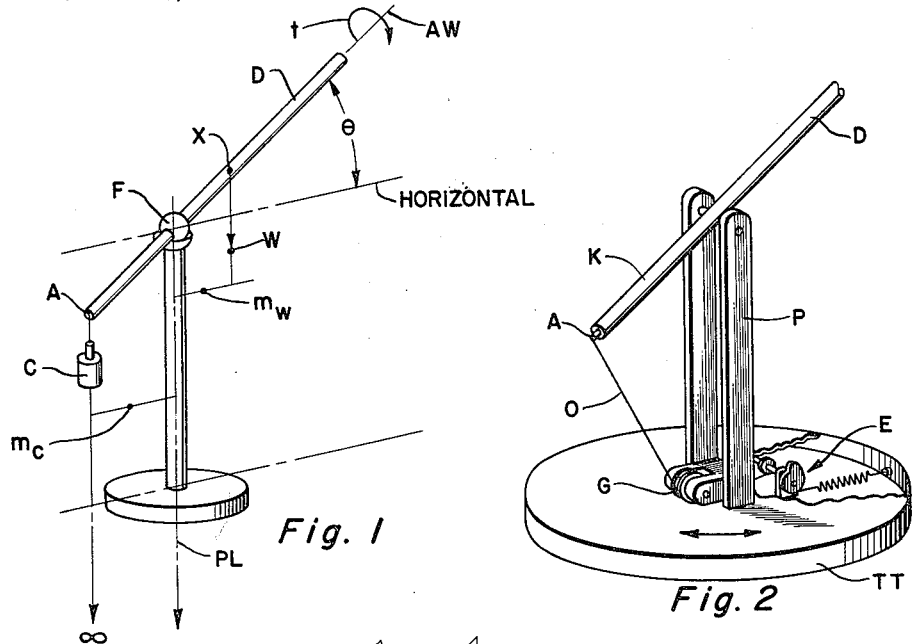
Fig. 1
Fig. 2
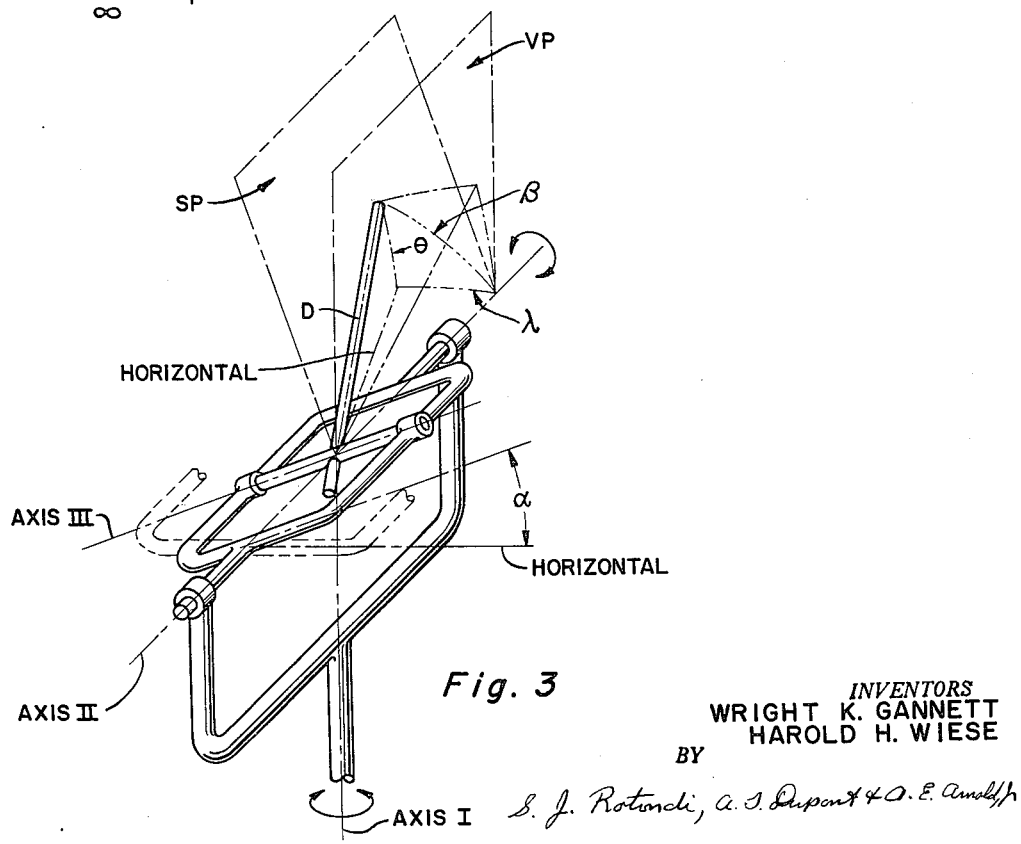
Fig. 3
INVENTORS
WRIGHT K. GANNETT
HAROLD H. WIESE
BY
S. J. Rotondi, A. J. Dupont & O. E. Arnold, Jr.

Feb. 26, 1963  W. K. GANNETT ET AL  3,078,766
EQUILIBRATOR FOR A GUN
Filed June 8, 1960  4 Sheets-Sheet 2

INVENTORS
WRIGHT K. GANNETT
HAROLD H. WIESE
BY

Feb. 26, 1963  W. K. GANNETT ET AL  3,078,766
EQUILIBRATOR FOR A GUN
Filed June 8, 1960  4 Sheets-Sheet 4

INVENTORS
WRIGHT K. GANNETT
HAROLD H. WIESE
BY

United States Patent Office 3,078,766
Patented Feb. 26, 1963

3,078,766
EQUILIBRATOR FOR A GUN
Wright K. Gannett and Harold H. Wiese, Davenport, Iowa, assignors to the United States of America as represented by the Secretary of the Army
Filed June 8, 1960, Ser. No. 34,853
4 Claims. (Cl. 89—37)

The present invention relates to an equilibrator and more particularly to a structural arrangement which will produce a counterbalance force for a mass mounted in overbalanced relation and which will permit movement of the mass in all directions or changes in position.

Heretofore, counterbalance arrangements generally deal with balancing a mass in a normal azimuth-elevation position without particular concern to changes in the center of gravity of the mass except insofar as elevation is concerned. In other words, prior art arrangements are provided for apparatus where the changes in elevation lie in a single vertical plane. These arrangements are not found suitable for systems in which it is desired to maintain balance regardless of the position of the mass in elevation, or in arrangements where the mass is adjustable with respect to three axes of freedom, namely, azimuth, elevation, and cant. In the latter case, for example, in items of ordnance, guns on mounts are customarily pivoted for tracking in random planes to facilitate tracking aerial targets. As a result, the equilibrator system must be flexible enough to follow the gun regardless of its random position.

A primary object of the present invention is to provide an equilibrator which will effectively counterbalance a mass mounted in overbalanced relation for orientation in random positions.

Another object of the present invention is to provide an improved equilibrator for a gun mounted for tracking in all elevation positions.

Still another object of the present invention is to provide an equilibrator for a mass mounted in overbalanced relation which will compensate for changes in degree of balancing force as a result of a shifting center of gravity due to changes in elevation of the mass.

A further object of the present invention is to provide an equilibrator system which produces a well balanced mechanism regardless of the positions of cant and elevation of the mass it is associated with.

It is also an object of the present invention to provide an improved equilibrator system for a gun mount which is universally applicable and which will effectively balance a gun in random tracking positions.

Also it is an object of the present invention to provide an equilibrator which is relatively simple in construction, efficient in operation, and inexpensive to manufacture.

In accordance with the present invention the desired results are achieved by providing an equilibrator which will progressively vary a counterbalance force in response to variation in elevation positions of the mass being balanced by utilizing a flexible counterbalance force transmitting means. The flexible transmitting means is connected with the mass and is disposed pivoted about a point located along a plumb line passing through the point of intersection of the cant and elevation axes in order to operate with freedom of movement in all directions regardless of changes in position of the mass.

The novel features characteristic of the present invention, both as to its organization and method of operation, as well as additional objects and advantages thereof, will be understood better when read in connection with the accompanying drawings in which a single, preferred embodiment of the present invention is represented and in which:

FIGURE 1 is a schematic view, in perspective, of apparatus illustrating the basic equilibration problem;

FIGURE 2 is a schematic view, in perspective, of a conventional azimuth-elevation apparatus provided with an equilibrator mechanism as seen through the broken-away portion of the turntable;

FIGURE 3 is a schematic view, in perspective, of a three-axis gimbal showing (in full line outline) the "wand" and its supporting frame disposed in a canted or slant plane position and showing (in phantom) a portion of the "wand" supporting frame disposed in a position for tracking in a vertical plane;

Figure 4:
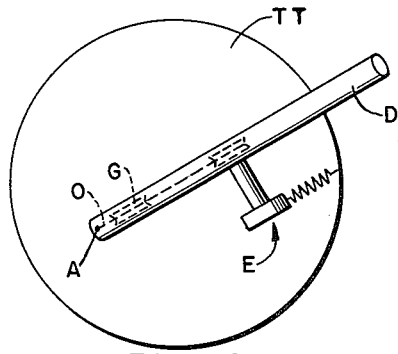
FIGURES 4, 5 and 6 are a series of schematic plan views illustrating the problem involving proper location of the equilibrator mechanism as between a two-axis gimbal and a three-axis gimbal.

Before referring to the present invention in greater detail, it is desired to point out the background theory leading to the development of the present invention. In accordance with this theory, it can be shown that an equilibrator can be provided for a three-axis mount which will effectively equilibrate a mass mounted in overbalanced relation regardless of its adjusted position.

The difficulty in equilibrating about two axes simultaneously is an entirely different sort of thing from one axis equilibration of the conventional azimuth-elevation mount. Cams alone cannot provide the required compensation. Instead, it is necessary to start out with basically correct geometry. These basic concepts are best illustrated and explained by utilizing a "wand." The need for a "wand" becomes evident subsequently where the actual application of the basic concept to a three-axis mount is considered.

The "wand" D represents a rod or stick the center of gravity of which remains fixed in relation to all positions of rotative motion of the rod. FIGURE 1 shows the basic equilibration problem. Its moment which must be equilibrated is $M_\text{w} = W m_\text{w} = W(\overline{FX}) \cos \theta$ being measured in a vertical plane through the "wand" and wherein:

$M_\text{w}$ = moment of the "wand"
$W$ = weight of the "wand"
$m_\text{w}$ = moment arm of the "wand"
$\overline{FX}$ = distance from F to X ($X$ = "wand" center of gravity)
$\theta$ = angle of elevation measured in the vertical plane through the "wand"

By the laws of statics the counterbalancing moment $M_\text{C}$, as well as its force, must likewise be in this plane. This is readily accomplished in a leveled conventional azimuth-elevation mount, because $\theta$ is the motion about the elevation axis. Consequently, equilibration needs to be performed only about this one axis without regard to the position in azimuth.

The leveled, three-axis gimbal likewise need not regard azimuth. However, it has two additional axes. The secondary axis II is cant and the tertiary axis III is elevation in the slant plane or canted elevation (as contrasted with actual elevation θ in the vertical plane). There is no single axis that produces the θ motion. In fact, a given value of θ can be achieved with an infinite number of combinations of positions about the secondary and tertiary axes.

The foregoing effect makes it extremely difficult to equilibrate individually at the secondary axis II and at the tertiary axis III because the counterbalancing moment at either axis is a mathematical function, not only of its own angular position, but also of the angular position about the other axis.

Instead, we equilibrate simultaneously about both the secondary and tertiary axes. As illustrated by FIGURE 1, the gimbal is shown as a ball joint F. For the ball we can substitute either a conventional azimuth-elevation gimbal or a three-axis gimbal, but this has no effect on equilibration requirements as long as θ is the same.

Obviously, the "wand" can be equilibrated by a suitable weight C suspended at A at the end of the "wand" for all values of θ regardless of whether a ball or one type of gimbal or another is used at F. F is simply a universal joint of some kind. The weight counterbalances around the secondary and tertiary axes simultaneously without regard to their particular angular positions, but with regard solely to the magnitude of θ, the actual angle of elevation.

However, the weight is not desirable since it would increase the total mount weight too much. Neither would it be easy to simulate the weight by mechanizing a counterbalancing full of fixed vertical direction and fixed magnitude at A.

It is necessary only that the counterbalance force lie in a vertical plane through the "wand" and, of course, that this force be of such a magnitude, direction, and with such a moment arm at point A as to produce the correct counterbalancing moment for all values of θ. To be in this vertical plane, the counterbalance force vector, extended from point A on the "wand," must intersect the plumb line PL through F (FIGURE 1). The counterbalance force does this at infinity ∞. Being parallel to the plumb line the intersection is at infinity and the two lines are in the same vertical plane through the "wand."

This requirement can be easily met in a conventional azimuth-elevation mount. Suppose the counterbalance force is applied by flexible cable O anchored at A, as shown in FIGURE 2. This cable can be directed to an equilibrator mechanism E by a sheave G located at some convenient point on pintle P or on the azimuth turntable TT that turns with this pintle. The direction and moment arm K of the counterbalance force changes with θ. However, the magnitude of the force is governed from the spring and cam of the equilibrator mechanism E so as always to produce the correct equilibrating moment for each and every value of θ.

The important point to note is that all the equilibrating mechanism for the conventional azimuth-elevation mount is carried by the pintle P or the azimuth turntable TT and consequently turns with the "wand" in azimuth, thereby maintaining a fixed relationship to the vertical plane through the "wand" for all values of azimuth and θ. This is also illustrated in plan view in FIGURE 4, which shows sheave G directly below the "wand": i.e., in the vertical plane through the "wand."

Figure 5:
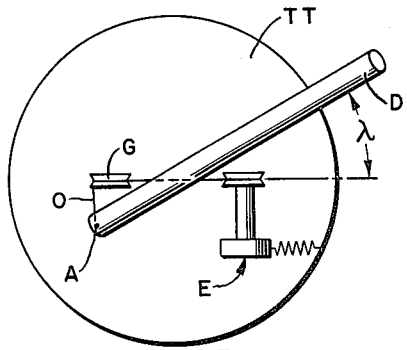
Figure 6:
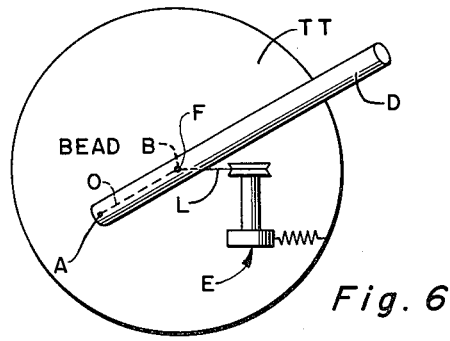

The same mechanism is more difficult to apply to a three-axis gimbal. Here the actual elevation angle θ of the "wand" comprises two components: cant α and elevation β in the slant plane SP (FIGURE 3). If the equilibrator force producing mechanism is carried by the azimuth turntable TT, it does not maintain a fixed relationship to the vertical plane VP through the "wand," but is displaced from it through an angle λ, as shown in FIGURE 5. λ is the projection upon a horizontal plane of the angular displacement of the "wand" from the cant axis II, the cant axis being in a fixed direction relative to the azimuth turntable. λ is always ≠zero if both α≠zero and β≠zero. This λ displacement means that sheave G cannot be put at any "convenient" point for the three-axis gimbal because it will not stay in the vertical plane through the "wand." When λ is unequal to zero, sheave G moves out from under the "wand" and cable section O is biased out of the vertical plane through the "wand" (see FIGURE 5). Instead, the cable must be brought all the way back to the point of intersection of cable section O with the plumb line through F. If we substitute a bead B for the sheave and visualize the cable as being as slick and flexible as a silk thread, the configuration of FIGURE 6 results in which the counterbalance force remains in the vertical plane through the "wand" regardless of the size of λ. The triangle FAB is in this vertical plane.

The angle between cable section O and the plumb line through F is φ. Up to the maximum value of φ cable section O describes a solid cone around the plumb line as an axis, as θ and λ are varied. This cone motion takes place in relation to the azimuth turntable TT.

Figure 7:
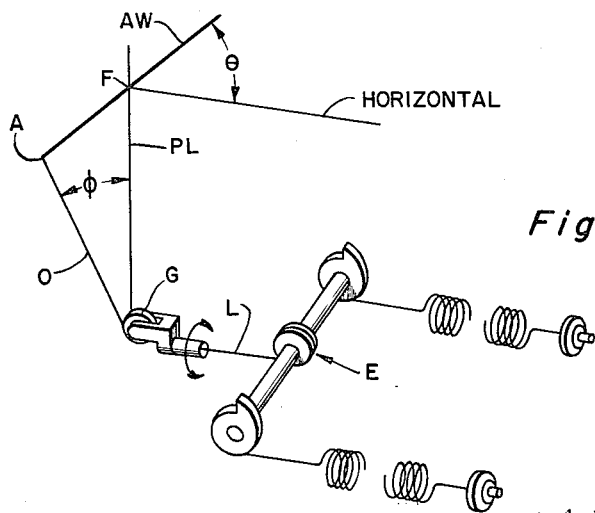
FIGURE 7 is a schematic view, in perspective, of an equilibrator mechanism for a three-axis gimbal.

In actual mechanization a bead would not be used. Instead a sheave G mounted caster fashion would be used as in FIGURE 7. The sheave swivels about cable section L as an axis to permit sheave G to follow the motions of cable section O so that the sheave will always lie in the plane defined by cable sections L and O. The point of tangency between sheave G and cable section O unavoidably "walks" up and down the plumb line a little as a result of the O section of the cable wrapping around the sheave as is clear from inspection of FIGURE 7.

Since the "wand" passes through the center of gravity to be equilibrated any twist "t" (FIGURE 1) about the axis AW of the "wand" will not change the equilibration. This is important to note, because when particular gimbals are substituted for ball F the twist will come out differently for a given "wand" direction. For example, the twist for a given "wand" direction is different between a conventional azimuth-elevation gimbal and the three-axis gimbal. In fact, for the latter, as the "wand" direction is held constant and λ is varied, the twist varies.

Of further importance is the distinction between the use of a gun and a "wand." The gun, in general, especially for the three-axis mount, does not necessarily pass through the center of gravity as the "wand" does. Twist is measured relative to the "wand" and equilibration must be performed relative to the "wand" so as to be geometrically correct and equilibrate about the axes simultaneously.

θ is measured in the plane of equilibration, which is determined by the "wand"—not by the gun. If equilibration were performed (incorrectly as shown in FIGURE 5) relative to the gun, the center of gravity would be eccentric to the gun axis and would be thrown laterally out of the plane of equilibration that passes vertically through the gun axis. At least this is true in the three-axis mount. In an azimuth-elevation mount this displacement of the center of gravity from the gun axis is in the vertical plane through the gun axis and never gets out of this plane because the gimbal permits no twist relative to this plane. In other words, λ is always zero. Thus, the "wand" concept becomes mandatory for designing an equilibrator for the three-axis gimbal, and need not be known at all to design an azimuth-elevation equilibrator.

Now let us consider all mass that moves when cant and elevation are operated. This is the mass that must be equilibrated and may comprise the gun 1, gun carriage and cradle 9, linkage YFJN, sight ST, bellcrank linkage YUTV, and even cable section O, such as the equipment illustrated in FIGURE 11 and schematically shown in FIGURE 8. The latter, being very light and being generally biased out of the slant plane, may be disregarded.

Figure 8:
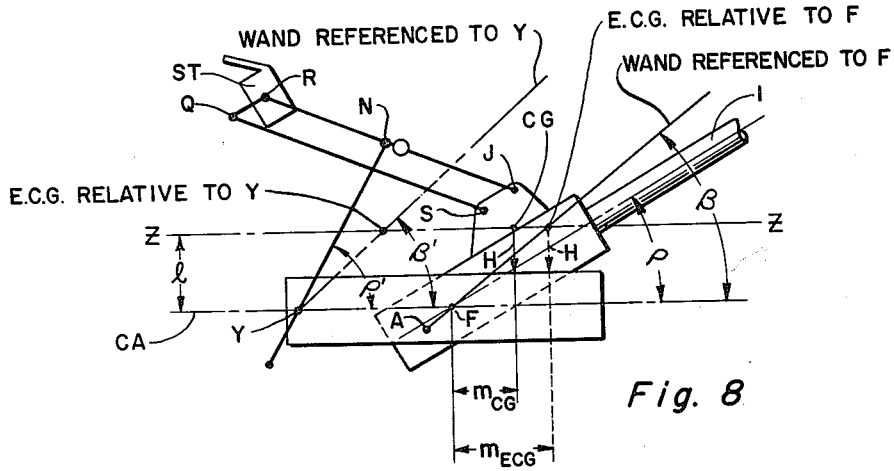
FIGURE 8 is a schematic side view of a typical gun and mount therefor, together with related components, and showing the various factors to be considered in solving the equilibrator problem.
Figure 9:
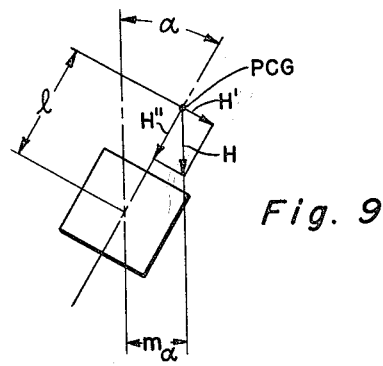
FIGURE 9 is a schematic front view of the apparatus illustrated in FIGURE 8.

The first step in solving the equilibration problem is to plot the center of gravity CG for the equilibrated mass for all values of ρ (elevation of the gun in the slant plane which is defined by the mount) on a diagram such as FIGURE 8. Now transfer this information to a front view such as FIGURE 9 and put in various cant angles. The total mass to be equilibrated may be represented by a weight H in FIGURE 9 acting through the projected center of gravity PCG at moment arm $m_a$. The $Hm_a$ moment is the moment to be compensated in cant. Obviously, as α is held constant and ρ varies, the center of gravity CG location in FIGURES 8, 9 changes and $m_a$ changes. Consequently moment $Hm_a$ changes. Thus, the cant equilibration requirement is a mathematical function of both α and ρ.

Now, with α=zero, let us consider the moments about the elevation axis at F. If all the equilibrated mass were an integral lump pivoted at F the moment at F would be $Hm_{CG}$. But the mass is not an integral lump and only a part of it is pivoted at F. The rest of it is related to the mass hinged at F through linkages and their mechanical advantages—or disadvantages. By the principles of kinematics, the actual moment about F can be computed. It is not necessary to repeat this procedure here. Call this moment $M_{ECG}$. This is the moment which could be measured at F if the structure were built and empirically measured at F with a torquemeter. This is the moment of the "equivalent center of gravity," also referred to herein as ECG.

If a line ZZ is drawn through the center of gravity parallel to the cant axis CA the equivalent center of gravity is that point along this line through which the total mass that is to be equilibrated may be considered as acting to produce $M_{ECG}$ at F. This point can be found by computing its moment arm.

$$m_{ECG} = \frac{M_{ECG}}{H}$$

The foregoing discussion of equivalent center of gravity has assumed α=zero solely for convenience in solving the equivalent center of gravity location and not because the actual value of α is of no concern. However, if α≠zero, the moment in elevation is $H''m_{ECG}=H$ cos $αm_{ECG}$. Thus, the equilibration requirement in elevation is a function of α as well as of ρ. That is, $m_{ECG}=f(ρ)$, $l=f(ρ)$, and $H''=f(α)$.

However, for all values of ρ and α, H acts as if it passes through the equivalent center of gravity as regards both its moment in cant and its moment in elevation in the slant plane. Thus, the "wand" in this case represents the gun and associated parts which may be equated to a hypothetical gun and shown as a straight line through F and the equivalent center of gravity. The "wand" is at an angle of elevation β in the slant plane and β≠ρ. Furthermore, β—ρ is not a constant. If it were a constant a point A (FIGURE 8) could be established fixed in relation to the gun and the cable and equilibrating mechanism of the type represented by FIGURE 2 could be hooked on at point A.

There are two objections to doing this. First, the gun is in the way of point A and the gun receiver would sweep through the equilibrator mechanism when the gun is elevated. Secondly, point A cannot actually be fixed relative to the gun because β—ρ is not constant.

To solve this problem, the equilibrator need not be swung around point F as a fulcrum at all. It might instead be swung around point Y to get clear of the gun.

Actually, β should not be dealt with at all when equilibrating at point Y. The "wand" through F and its angle β are valid only for applying the equilibrator to point F. If the equilibrator is applied to point Y, a new "wand" must be found by procedures similar to those used at F but with moments related to point Y (FIGURE 8). The new "wand" referenced to point Y will be at a new angle β'≠β, through a new equivalent center of gravity referenced to Y, but still on line ZZ.

The moments produced about point Y by H, acting through the new equivalent center of gravity, would equal the moments empirically measured by a torquemeter at Y on an actual structure. These moments would be related to those at F by the laws of kinematics taking into account the mechanical advantages or disadvantages through the linkage and the weights of sight and individual linkage components.

If the bellcrank at point Y were an extension of link YN, or at a fixed angle to YN, it would move through angle ρ' which is different from gun angle ρ. But a bellcrank at Y should move through angle β' so as to match angle β' of the new "wand" at Y.

Figure 10:
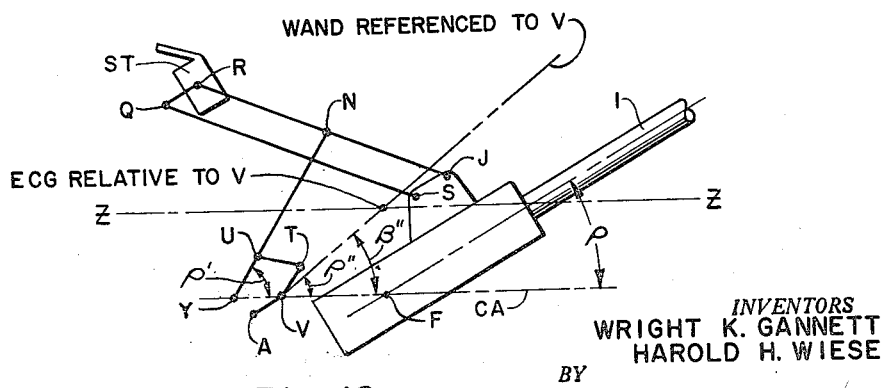
FIGURE 10 is a schematic side view similar to that shown in FIGURE 8 but representing the components and their relation after computation.

This rather difficult and sophisticated process must be repeated again and again until the answer narrows down so that everything comes true at the same time. Since both the angular positions of the "wands" and the angular positions of the bellcranks are mathematical functions, a change of this linkage changes both. However, the problem-solving procedure, which is too lengthy to detail here, permits the answer to be successfully narrowed down to the point where the bellcrank very closely follows the "wand" direction and, thereby, at the same time traveling with a variable angle to the gun. Now the equilibrator mechanism can be attached to point A of FIGURE 10 and with the correct selection of a spring and shaping of the cam a total equilibrator mechanism is achieved which floats in all positions of cant and elevation in the slant plane.

In review, the "wand" is a straight line joining the bellcrank center to its equivalent center of gravity. If the "wand" is regarded as weightless and if the total mass to be equilibrated were concentrated at the equivalent center of gravity on the "wand," the "wand" would become a single "stick" to be equilibrated in α and β equivalent to the entire mass to be equilibrated. In further review, the angle of actual elevation lies in a vertical plane through the "wand." The equilibrator mechanism must produce its countermoment in this plane and the magnitude of that moment is a mathematical function of θ. Thus, the "wand" establishes the θ plane and the magnitude of θ so that an equilibrator can be made. Such an equilibrator works simultaneously in α and β without regard to the values of each, but only in regard to the value of θ which results from the vectorial combination of α and β. There can be an infinite number of combinations of α and β to produce the same θ.

Figure 11:
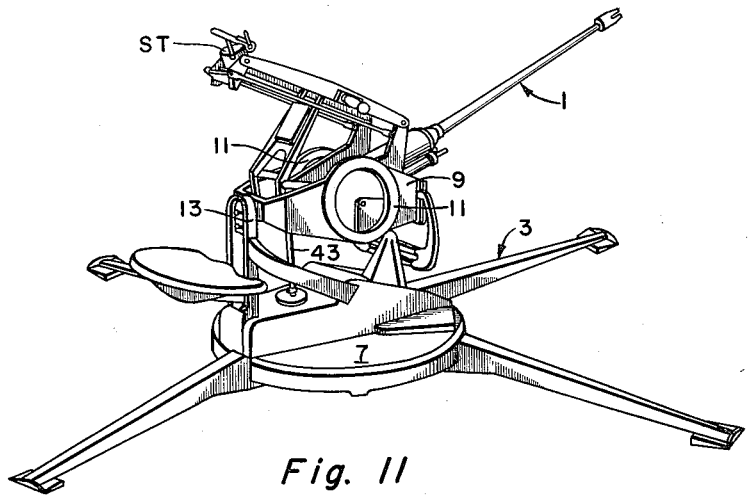
FIGURE 11 is a perspective view of a typical gun and gun mount to which the present invention is applicable.
Figure 12:
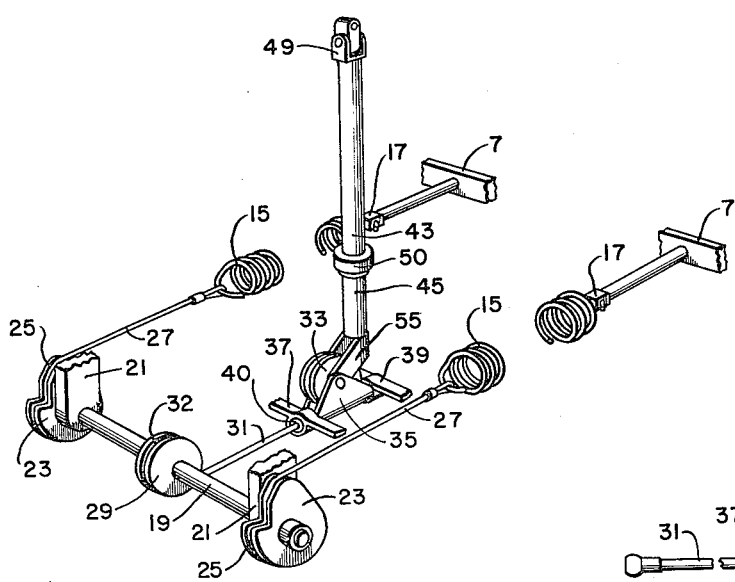
FIGURE 12 is an enlarged perspective view, partly broken away, of the equilibrator system of the present invention such as would be employed with the apparatus shown in FIGURE 11.
Figure 13:
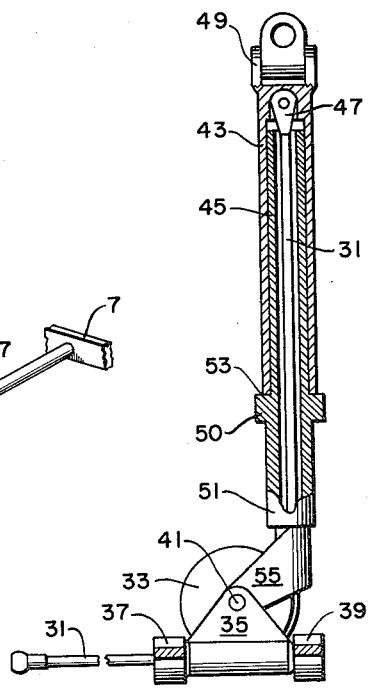
FIGURE 13 is an enlarged side view, partly in section and partly in elevation, of a portion of the system shown in FIGURE 12.

In furtherance of this theory, the equilibrator system of the present invention is depicted in FIGURES 11, 12, and 13 embodied on a three-axis gun mount as a practical example. In apparatus of this kind, a gun 1 is mounted in overbalanced relation upon a mount 3 for tracking an aerial target. The mount is provided with three axes. The first two, azimuth and cant, serve to orient the third, elevation, perpendicular to the slant plane so that the gun may move solely about that third axis when tracking in the slant plane. FIGURE 11 shows this type of gun mount wherein orientation in azimuth is accomplished by movement of the gun carriage and supports substantially in a horizontal plane relative to the base 7. Orientation in elevation is accomplished by mounting this gun and its carriage 9 about a pair of trunnions 11 which establish the elevation axis, and orientation in a slant plane is accomplished by moving the gun and its cradle about trunnions 13 (only one of which is visible in FIGURE 11) which establish the cant axis which is disposed normal to the elevation axis in such a position that the elevation and cant axes will intersect. Thus, it will be recognized that the gun is gimbaled differently from the ordinary azimuth-elevation mount and requires counterbalancing about two axes (elevation and cant) simultaneously. As a result, equilibration must compensate for changes in the center of gravity for all combinations of elevation and cant of the combined mass which, in the case of the present embodiment, would include the gun, gun cradle, sight, and mechanism employed in tracking apart from the base.

The apparatus or system of the present invention which will accomplish this is particularly shown in FIGURE 12 of the drawings. For the purpose of providing a counterbalance force, a pair of coil springs 15 are mounted for freedom of movement on the base 7 by having one end 17 of each spring attached to the base in any convenient manner. The springs are disposed in parallel, spaced apart relation under the base in order to uniformly distribute the load on the entire mount.

Inasmuch as the counterbalance force progressively varies in response to raising and lowering of the gun, there is provided a cam arrangement to compensate therefor which is also disposed beneath the base 7. This cam arrangement comprises a shaft 19 journalled on supports 21 which are attached to the base in any convenient manner. A pair of sheaves 23 having a grooved cam surface 25 are attached to the shaft for rotation therewith. A flexible cable 27 connects each one of the free ends of the coil springs 15 with respective ones of the sheaves. An end portion of each cable is disposed within the groove of the cam surface and extends around the cam surface sufficiently to permit the cam surface to control the degree of force imposed by the spring. The parameters of the cam surface are selected according to the combined forces necessary to equilibrate the mass to be counterbalanced.

As a means of transmitting the counterbalance force imposed by the springs to the gun, the shaft 19 is provided with a sheave 29 and a flexible cable 31 is connected between this sheave and the gun or its cradle. The end portion of the cable attached to the sheave is partially wrapped around the grooved surface 32 of the sheave 29 thereof to allow axial adjustment as a result of raising and lowering the gun. An idler sheave 33 is journalled on the base 7 so it can rotate "caster fashion." This is accomplished by journalling the sheave support 35 on the base at two oppositely disposed ends 37, 39 thereof so that the sheave can rotate relative to the base. The journalled end 37, which is located adjacent to the cam shaft sheave 29, is provided with an aperture 40 extending axially therethrough the purpose of which is to permit the cable 31 to be threaded through the journalled end and around the sheave. It will be recognized that the sheave and its rotation axis 41 are disposed above and to one side of the common axis of the sheave support journalled ends 37, 39.

In order to facilitate freedom of movement of the flexible cable in all directions as it follows traverse of the gun, the sheave is so disposed that the cable is diverted from a point of tangency on the sheave which is located substantially on a plumb line beneath the intersection of the cant and elevation axes. In this manner, it will be observed that the diverted portion of the cable is free to move in all directions about the point of tangency which functions as a pivot point thereby providing adjustment for the cable simultaneously about two axes. Thus, the flexible cable 31 is freely movable in all directions as it follows movement of the gun either in elevation or cant because the sheave will follow the cable. The idler sheave comprises a direction changing guide means for the flexible cable 31 and thereby fulfills two main functions in the respect that it not only diverts the flexible cable for transmitting a lineal counterbalance force, but it also serves as a pivot for freedom of movement incident to random orientation of the cable while allowing it to be moved in an axial direction.

Inasmuch as the equilibrator of the present embodiment is disposed beneath the base 7, that portion of the flexible cable 31 extending from the idler sheave 33 to the gun extends through an opening (not shown) in the base and would be unprotected. Therefore, as shown particularly in FIGURE 13 of the drawings, there is provided a hollow shield in the form of two telescoping sleeves 43, 45 which will allow the cable to move in axial directions during tracking operations. This is accomplished by appropriately attaching the end 47 of the flexible cable 31 to one end 49 of the outer sleeve 43 so that it can extend through the hollow interior of both sleeves in their assembled relation. The inner sleeve 45 is provided with an external annular flange 50 adjacent its lower extremity 51 which serves as a stop for the outer sleeve upon engagement by the opposite end 53 of the latter sleeve. Attached to the inner sleeve at the lower extremity thereof is a bifurcated bracket or yoke 55 which embraces the idler sheave 33 and is journalled on the shaft axis 41. In this manner, the sleeves are free to rotate relative to and about the idler sheave in response to changes of position of the gun or member to which the end 47 of the outer sleeve is attached, and, at the same time, the inner sleeve 45 is held fixed relative to the outer sleeve 43.

From the foregoing description, it will be recognized by persons skilled in the art that the equilibrator of the present invention provides distinct advantages over the prior art for three-axis mounts. The arrangement is not only relatively simple in construction but it is universally applicable to all situations requiring equilibration particularly where the unbalanced mass requires counterbalancing about two axes (elevation and cant) simultaneously.

Although only a single embodiment of the present invention has been illustrated and described herein, it will become obvious also to those persons skilled in the art that changes and modifications of the present invention are possible within the spirit of the invention. For example, although the means for producing an equalizing force is illustrated as a spring member, it would be possible to utilize a hydraulic arrangement without departing from the invention. Various other changes of similar scope will, no doubt, readily suggest themselves. Therefore, it is desired that the particular form of the present invention described herein be considered as illustrative and not as limiting.

What is claimed is:

1. In an item of ordnance including a gun mount adapted for emplacement in a fixed position and a gun supported on said mount in overbalanced relation and being adjustable about multiple axes including an elevation axis and a cant axis, said elevation and said cant axes being disposed normal to each other and intersecting, an equilibrator for said gun comprising counterbalance force producing means attached to said mount, means for progressively varying the force imposed by said counterbalance force producing means carried by said mount and attached to said counterbalance force producing means, and force transmitting means connecting said counterbalance force varying means with said gun, said force transmitting means including direction changing guide means pivotally mounted on said mount and supporting a portion of said force transmitting means for freedom of movement in all directions in response to random orientation of said gun.

2. The invention as defined in claim 1 wherein said counterbalance force varying means comprises means providing a cam surface, and means connected with said counterbalance force producing means a portion of which is flexible and in engagement with said cam surface, said flexible portion being operable to transmit said counterbalance force to said cam surface means and thence to said force transmitting means connected therewith.

3. The invention as defined in claim 2 wherein said guide means comprises a sheave operatively arranged to provide a pivot for said freely movable portion, said sheave being disposed to locate said pivot at a point along a plumb line extending through the intersection of said elevation and said cant axes.

4. An equilibrator for a gun pivotally mounted in overbalanced relation on a fixed support comprising a pair of spring members each having an end connected to said fixed support and disposed in spaced apart parallel relation, a rotatable shaft carried by said fixed support, a pair of cam members mounted in spaced apart parallel relation on said shaft, first and second flexible members connecting respective ends of said spring members with separate ones of said cam members and being partially wound on said cam members, said first and second flexible members maintaining said spring members under tension, a first sheave mounted on said shaft between said cam members, a third flexible member having one end thereof connected with said first sheave and being partially wound thereon, the opposite end of said third flexible member being connected to said gun, and a second sheave comprising direction changing guide means carried by said fixed support and engaging said third flexible member interjacent the ends thereof thereby to support a portion of said third flexible member for freedom of movement in all directions in response to random orientation of said gun relative to said fixed support.

References Cited in the file of this patent

UNITED STATES PATENTS

| | | |
|---|---|---|
| 1,549,190 | England | Aug. 11, 1925 |
| 1,812,800 | Methlin | June 30, 1931 |
| 2,564,360 | Hammar et al. | Aug. 14, 1951 |
| 2,678,188 | Rogers | May 11, 1954 |

FOREIGN PATENTS

| | | |
|---|---|---|
| 820,994 | France | Aug. 17, 1937 |
| 1,218,339 | France | Dec. 14, 1959 |